US007763843B2

(12) United States Patent
Flum et al.

(10) Patent No.: US 7,763,843 B2
(45) Date of Patent: Jul. 27, 2010

(54) OPTICAL NAVIGATION SYSTEM FOR ROTARY CONTROL BASED NON-CONTACT CONTROLLER

(75) Inventors: Alan Flum, Tamarac, FL (US); James Mazur, Ft. Lauderdale, FL (US)

(73) Assignee: Stanton Magnetics, Inc., Deerfield Beach, FL (US)

( * ) Notice: Subject to any disclaimer, the term of this patent is extended or adjusted under 35 U.S.C. 154(b) by 1143 days.

(21) Appl. No.: 10/790,441

(22) Filed: Mar. 1, 2004

(65) Prior Publication Data

US 2005/0195698 A1 Sep. 8, 2005

(51) Int. Cl.
*G01D 5/34* (2006.01)

(52) U.S. Cl. ...................... 250/231.18; 250/555; 84/82; 382/107; 341/53

(58) Field of Classification Search ............. 250/231.1, 250/231.12, 221, 208.1, 208.2, 231.13, 206.1, 250/206.2, 555; 382/107; 345/163, 165, 345/166, 185, 156, 18; 341/35; 84/82, 612, 84/640
See application file for complete search history.

(56) References Cited

U.S. PATENT DOCUMENTS 3,657,551 A * 4/1972 Lingert et al. ............ 250/206.1
5,900,930 A * 5/1999 Simon et al. ................ 356/138
5,965,879 A * 10/1999 Leviton ................. 250/231.13
6,320,185 B1 * 11/2001 Matsuo .................. 250/231.13
6,459,389 B1 * 10/2002 Germuth-Loffler et al. .... 341/13
6,541,690 B1 * 4/2003 Segers, Jr. ..................... 84/605
6,603,115 B1 * 8/2003 Gordon-Ingram ...... 250/231.14
6,642,506 B1 * 11/2003 Nahum et al. .......... 250/231.13
6,789,042 B2 * 9/2004 Boyton ....................... 702/150
6,844,871 B1 * 1/2005 Hinckley et al. ............ 345/163
7,019,280 B2 * 3/2006 Kokubo et al. ........... 250/231.1
7,060,968 B1 * 6/2006 Leviton ................. 250/231.13
2001/0011497 A1 * 8/2001 Yamada et al. ................ 84/602
2002/0021450 A1 * 2/2002 Aoki .......................... 356/499
2004/0238725 A1 * 12/2004 Ornellas et al. ............. 250/221

FOREIGN PATENT DOCUMENTS

WO WO 02/01160 A1 * 1/2002

* cited by examiner

*Primary Examiner*—Georgia Y Epps
*Assistant Examiner*—Francis M Legasse, Jr.
(74) *Attorney, Agent, or Firm*—Stone Creek LLC; Alan M. Flum

(57) ABSTRACT

The controller of the present invention includes an optical navigation system which is responsive to movement, velocity of position of a rotatable platter. The optical navigation system is responsive to rotation of the rotatable platter and is further responsive to at least one degree of freedom of tilting of the rotatable platter. The rotatable platter typically includes a textured pattern so that the optical navigation system can acquire sequential surface images of the textured pattern.

8 Claims, 4 Drawing Sheets

OPTICAL NAVIGATION SYSTEM FOR ROTARY CONTROL BASED NON-CONTACT CONTROLLER

BACKGROUND OF THE INVENTION

1. Field of the Invention

The invention pertains to a rotary non-contact controller. In particular, the invention pertains to an optical navigation system with at least two degrees of freedom.

2. Description of the Prior Art

In the prior art, there are many kinds of rotary controller devices. However, it has been difficult to design practical controllers with sufficient size and resolution for certain applications. In addition, it has been difficult to design a rotary controller with at least two degrees of freedom, one rotational, and the other with an axis perpendicular to the axis of rotation. For example, a large rotary control wheel on jog CD players for disc jockey applications generally does not have sufficient resolution and only a single degree of freedom.

In addition, contact controller have had substantial maintenance concerns as "contact" of the moving parts inherently causes wear and tear.

OBJECTS AND SUMMARY OF THE INVENTION

It is therefore an object of the present invention to provide a controller with at least two degrees of freedom, for the control of at least two independent variables.

It is therefore a further object of the present invention to provide a controller which maintains simple and intuitive use for the user.

It is therefore a still further object of the present invention to provide a high resolution, high speed, multi-axis controller.

It is therefore a still further object of the present invention to provide a controller which, in many respects, can be considered a non-contact controller.

These and other objects are attained by the present invention wherein an optical navigation system is provided with a non-contact controller and a rotating control wheel or platter. At least a portion of the control wheel includes a flat material with a random pattern design on the surface for providing a reference for the optical sensor. Of the degrees of freedom of movement of the controller, one is provided by the rotation of the control wheel and at least one other is provided by the orthogonal movement of the control wheel. The non-contact controller can be velocity sensitive, motion sensitive, and/or position sensitive in each axis. The resulting output can be via virtually any standard computer connection, particularly connections to a standard personal computer (PC) or similar device. Typical connections include USB, firewire, serial or wireless connection. The use of the optical navigation system thereby creates a high resolution, high speed, multi-axis controller.

A typical application of the controller is for audio or disk jockey type applications.

BRIEF DESCRIPTION OF THE DRAWINGS

Further objects and advantages of the invention will become apparent from the following description and from the accompanying drawings, wherein.

DETAILED DESCRIPTION OF THE PREFERRED EMBODIMENTS

Figure 1:
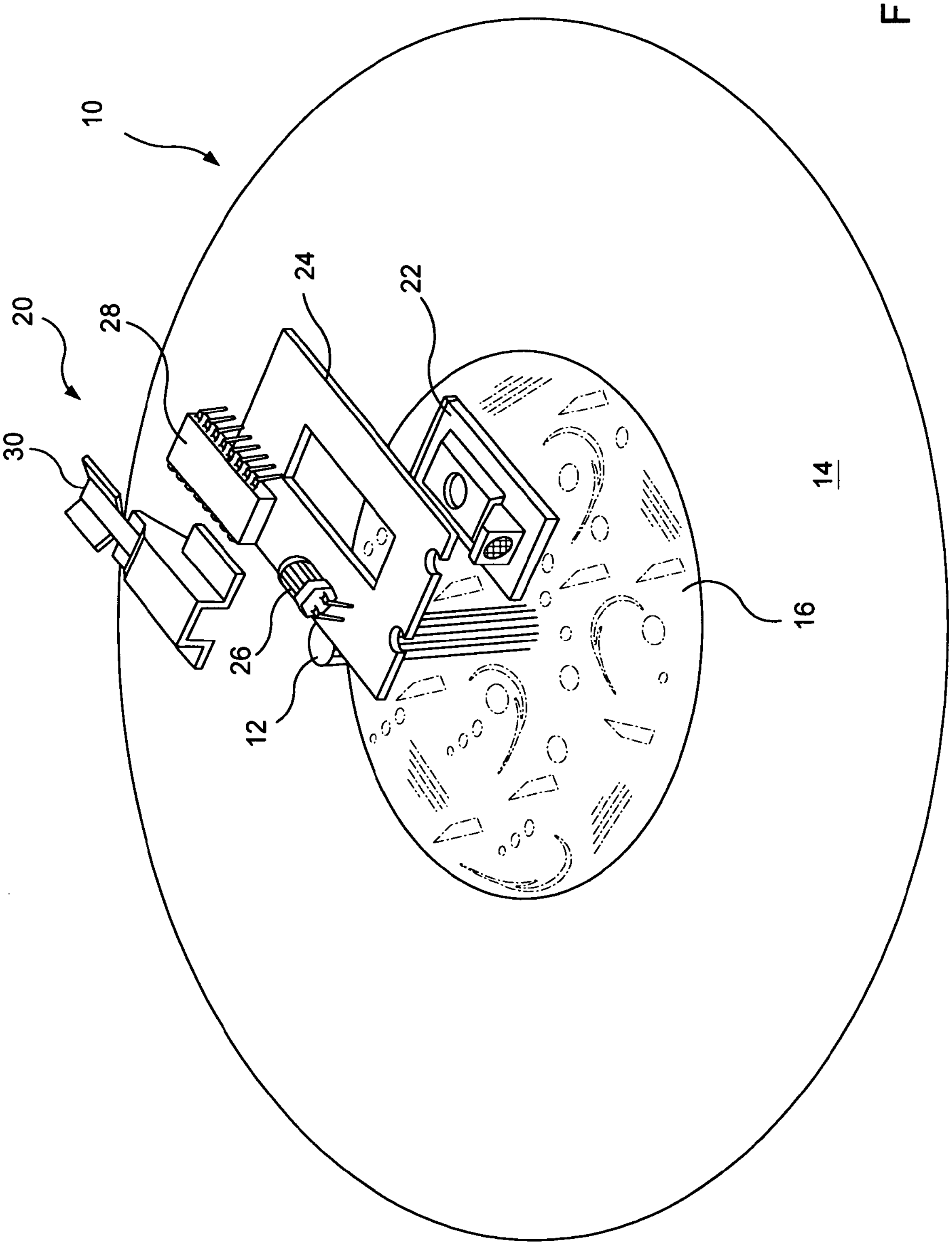
FIG. 1 is a perspective view, including an exploded view of the optical navigation system, of the underside of the controller of the present invention.
Figure 2:
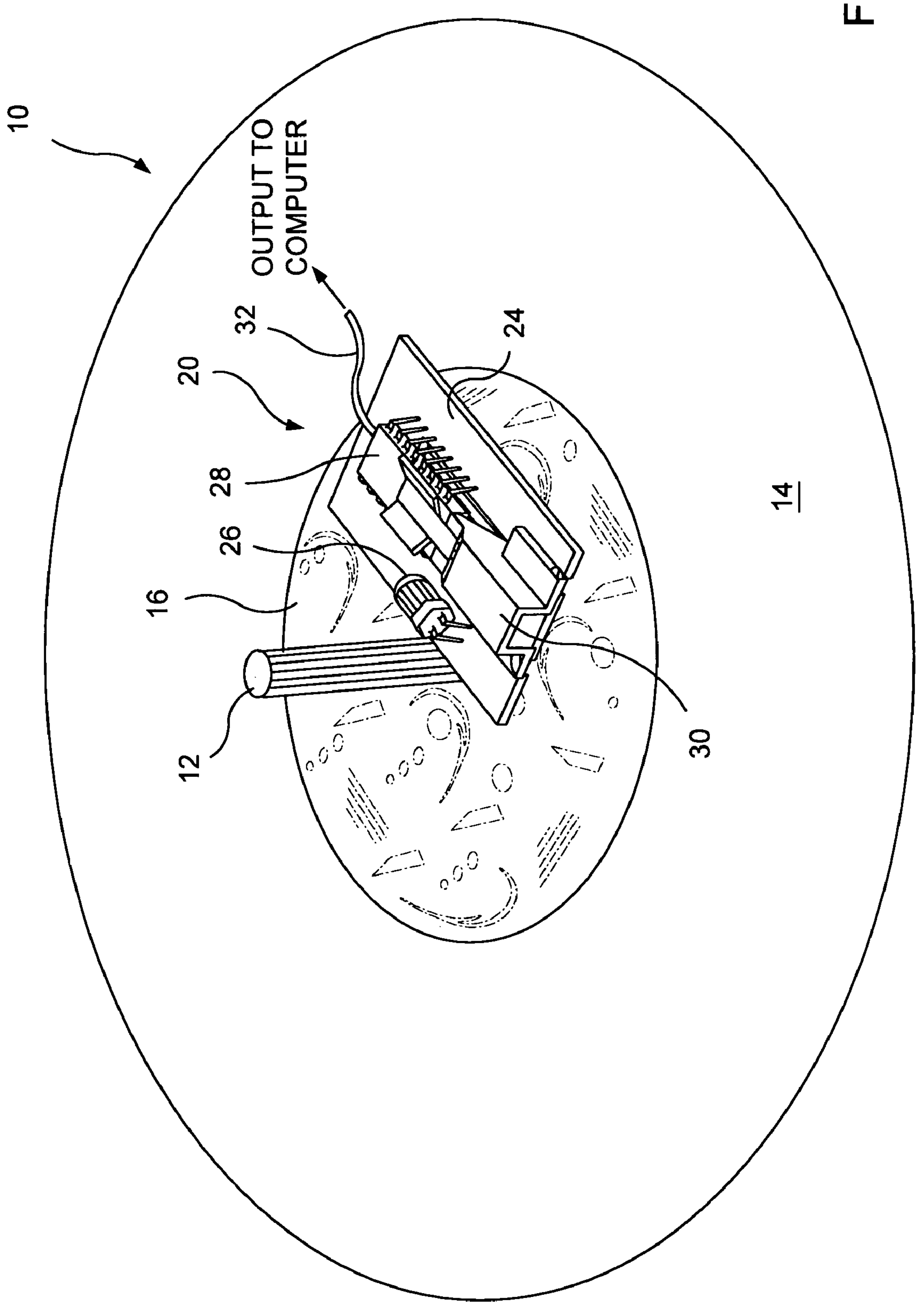
FIG. 2 is a perspective view, including a perspective view of the optical navigation system, of the underside of the controller of the present invention.

Referring now to the drawings in detail wherein like numerals indicate like elements throughout the several views, one sees that controller 10 is shown in perspective in FIGS. 1 and 2. Shaft 12 is journaled for rotation in concert with circular platter 14. The underside of circular platter 14 is shown in FIGS. 1 and 2, so that the view is from below. The interior portion of circular platter 14, proximate to shaft 12, includes portion 16 upon which a random pattern is printed. Additionally, shaft 12 can be pivoted laterally which provides for at least one, and as many as two additional degrees of freedom. Typically, shaft 12 can be pivoted forward and away (sometimes referred to as "up and down"), and may even be additionally pivoted to allow side-to-side motion, which is an additional degree of freedom which can control another variable.

Optical navigation system 20 is secured to the base (not shown) and is positioned on the underside side of circular platter 14 about portion 16 to optically acquire sequential surface images (frames) and mathematically determine the direction and magnitude of movement. As shown in FIG. 1, the optical navigation system 20 includes lens 22 (typically an HDNS-2100), circuit board 24 (which is typically secured to the base 'not shown'), LED 26 (typically an HLMP-ED80-XXXXX), sensor 28 and clip 30. A typical sensor 28 would the Agilent ADNS-2051 Optical Mouse Sensor, the Data Sheet of which, dated Oct. 24, 2001, is hereby incorporated by reference, both for the sensor 28 and for other components of optical navigation system 20. Those skilled in the art will recognize a range of equivalents after review of the present disclosure. After the calculations are performed, the result is communicated to a computer (not shown) or similar digital device via output 32. The output can be based on position, velocity or motion in any of the axes of motion.

Figure 3:
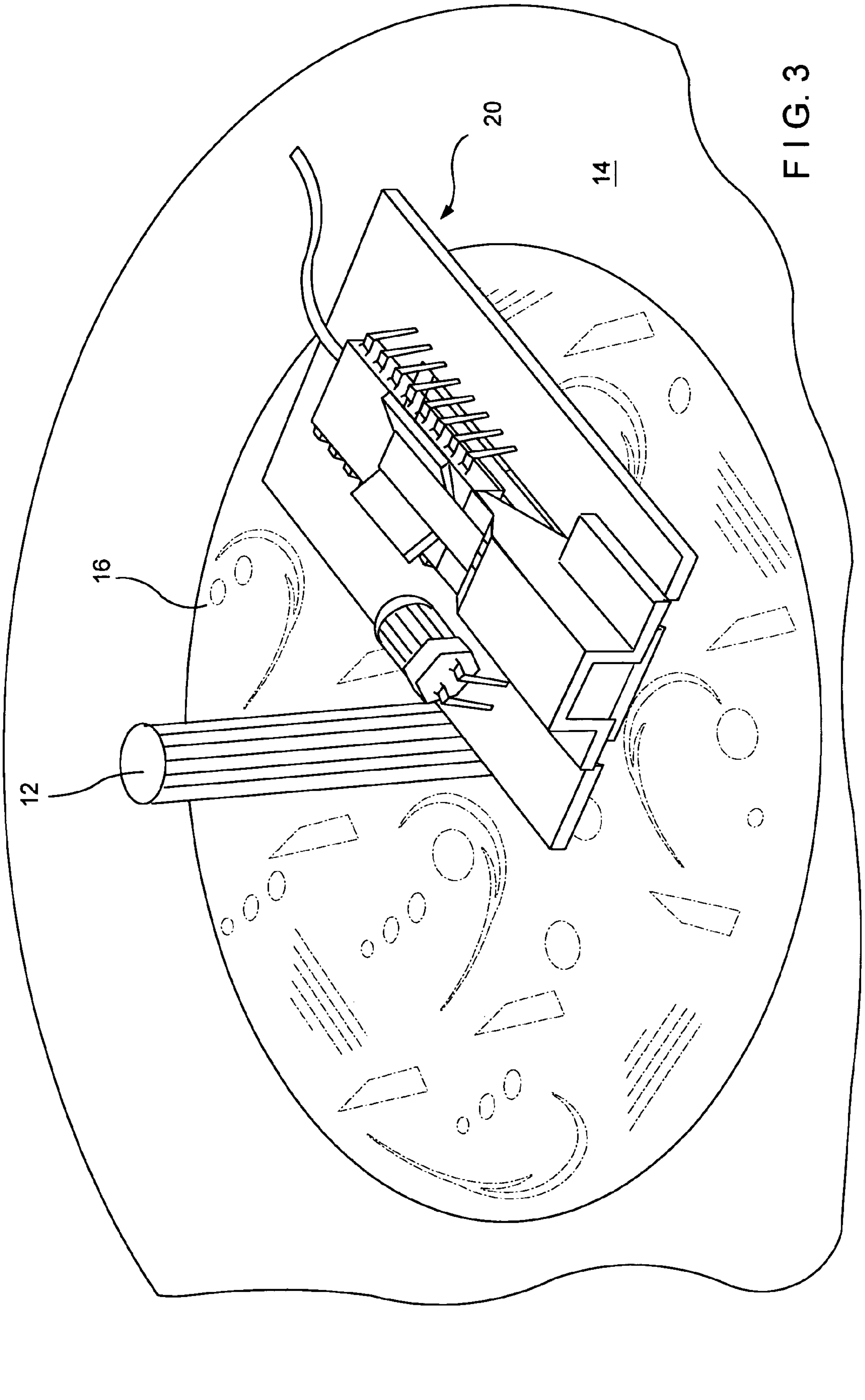
FIG. 3 is a close-up perspective view of the controller of the present invention.

FIG. 3 shows optical navigation system 20 in closer detail.

Figure 4:
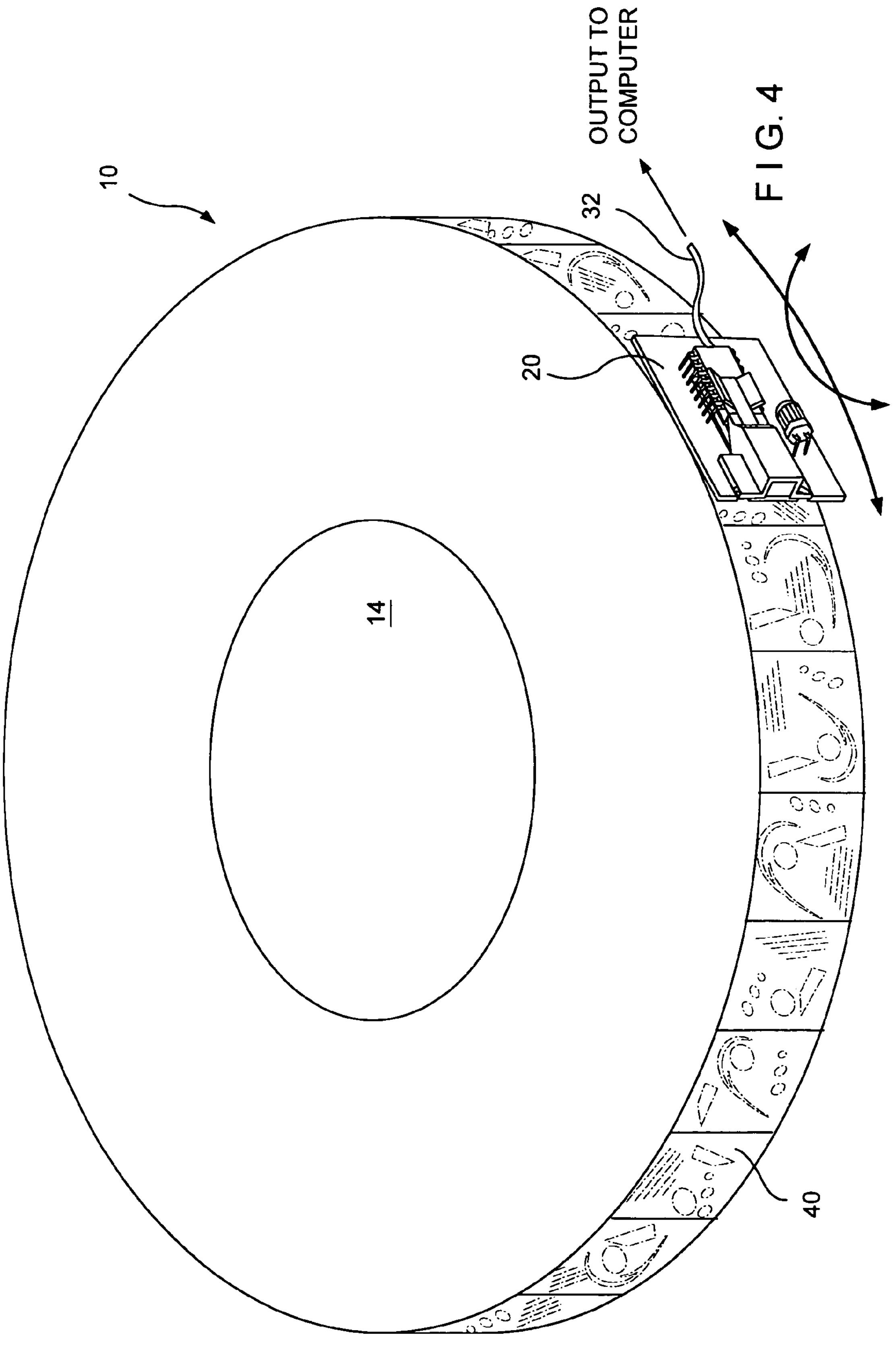
FIG. 4 is a perspective view of an alternative embodiment of the present invention wherein the optical navigation system is placed about the periphery of the rotatable platter.

FIG. 4 shows an alternative embodiment wherein the rotatable platter 14 includes a circumferential skirt 40 with a printed random pattern, similar to the pattern on portion 16 of rotatable platter 14 shown in FIGS. 1 and 2. Optical navigation system 20 is positioned to optically acquire sequential surface images from circumferential skirt 40 and mathematically determine the direction and magnitude of movement.

To use this controller 10, the user rotates rotatable platter 14 and further rocks or tilts rotatable platter in any of the additional one or two degrees of freedom. The position, velocity or motion of rotatable platter 14 is detected by optical navigation system 20 and the resulting signal is transmitted to a computer (not shown) or similar digital device via output 32.

Thus the several aforementioned objects and advantages are most effectively attained. Although a preferred embodiment of the invention has been disclosed and described in detail herein, it should be understood that this invention is in no sense limited thereby and its scope is to be determined by that of the appended claims.

What is claimed is:

1. A controller comprising:

a rotatable platter journaled for rotation, said rotatable platter including a top surface and a side circumferential skirt substantially perpendicular to said top surface, said circumferential skirt includes a random pattern;

said rotatable platter disposed for direct user manipulation and rotation;

a relative displacement detecting optical system comprising a lens, an image sensor, a light source and a signal processor responsive to relative movement of said rotatable platter based on information derived from said random pattern;

said optical system being positioned to optically acquire surface sequential images from said random pattern of said side circumferential skirt and calculate differences in said sequential surface images of said random pattern thereby determining the direction and relative displacement of rotation of said rotatable platter; and said optical system including an output responsive to said rotatable platter.

2. The controller of claim 1 wherein said output is relative rotational velocity calculated from said relative displacement of said rotational platter.

3. The controller of claim 1 wherein said output is relative rotational position calculated from said relative displacement of said rotational platter.

4. The controller of claim 1 further comprising:

a stationary base, wherein optical system is fixed with respect to the stationary base;

wherein said rotatable platter has at least one degree of freedom of movement in addition to rotation, an extent of movement of said at least one degree of freedom of movement being determined by said optical system optically acquiring sequential images from said random pattern approximately parallel to the axis of rotation of said side circumferential skirt.

5. The controller of claim 1 wherein said light source is a light emitting diode (LED).

6. The controller of claim 1 wherein said optical system is an based on optical navigation system technology.

7. The controller of claim 1 wherein the controller is used for a disk jockey application.

8. The controller of claim 1 wherein said top surface of said rotatable platter disposed for direct user manipulation.

* * * * *